(12) United States Patent
Ahn

(10) Patent No.: US 7,692,668 B2
(45) Date of Patent: Apr. 6, 2010

(54) APPARATUS AND METHOD FOR AUTOMATICALLY COMPENSATING FOR AN IMAGE GRADIENT OF A MOBILE COMMUNICATION TERMINAL

(75) Inventor: Chung-Hyuk Ahn, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1174 days.

(21) Appl. No.: 10/865,980

(22) Filed: Jun. 10, 2004

(65) Prior Publication Data

US 2004/0252913 A1 Dec. 16, 2004

(30) Foreign Application Priority Data

Jun. 14, 2003 (KR) ...................... 10-2003-0038547

(51) Int. Cl.
*G09G 5/00* (2006.01)
*G06F 3/033* (2006.01)
(52) U.S. Cl. ...................................... 345/619; 715/863
(58) Field of Classification Search ................. 345/156, 345/619, 581, 589, 10, 12–14, 20, 24, 651, 345/677; 455/899; 382/167; 715/863
See application file for complete search history.

(56) References Cited

U.S. PATENT DOCUMENTS 6,072,443 A * 6/2000 Nasserbakht et al. ........ 345/156

| 2004/0174375 | A1* | 9/2004 | Credelle et al. | 345/589 |
|---|---|---|---|---|
| 2005/0097191 | A1* | 5/2005 | Yamaki et al. | 709/219 |
| 2005/0134600 | A1* | 6/2005 | Credelle et al. | 345/589 |
| 2006/0001647 | A1* | 1/2006 | Carroll | 345/156 |
| 2006/0187305 | A1* | 8/2006 | Trivedi et al. | 348/169 |
| 2006/0227103 | A1* | 10/2006 | Koo et al. | 345/156 |
| 2006/0238502 | A1* | 10/2006 | Kanamori et al. | 345/156 |
| 2007/0070037 | A1* | 3/2007 | Yoon | 345/156 |

FOREIGN PATENT DOCUMENTS

| JP | 2003-186462 | 7/2003 |
|---|---|---|
| JP | 2005-266061 | 9/2005 |

* cited by examiner

*Primary Examiner*—Ryan R Yang
(74) *Attorney, Agent, or Firm*—Lee, Hong, Degerman, Kang & Waimey

(57) ABSTRACT

Disclosed are an apparatus and a method for automatically compensating for an image gradient of a mobile terminal display. The apparatus and method capture a user's image, determine the user's line of sight, calculate an image gradient between the user's line of sight and a reference coordinate system of the mobile terminal, and generate control information used to adjust displayed images to coordinate for the image gradient.

39 Claims, 3 Drawing Sheets

APPARATUS AND METHOD FOR AUTOMATICALLY COMPENSATING FOR AN IMAGE GRADIENT OF A MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 38547/2003, filed on Jun. 14, 2003, the contents of which is hereby incorporated by reference herein in their entirety:

BACKGROUND OF THE INVENTION

1. Field of the Invention

The present invention relates to a mobile communication terminal, and more particularly, to an apparatus and a method for automatically compensating for the angle between a user's line of sight and the mobile communication terminal (hereafter referred to as "the image gradient") such that the image displayed by the terminal is adjusted to compensate for the image gradient.

2. Description of the Related Art

As new mobile communication systems are introduced, for example those that provide video communication capabilities, users are more concerned with the quality of the images displayed by a mobile communication terminal. In response to these concerns, mobile communication terminals with improved display units have been fabricated and research has being performed to improve the quality of the images displayed by mobile communication terminals.

However, while improved display units may provide higher quality images, they cannot overcome the problem presented when the user views the display of the mobile communication terminal at a less-than-optimum angle. For example, when the user views the display of a mobile communication terminal such that the display is at an angle with respect his or her eyes, the image may appear distorted. No matter how high the quality of the image displayed, the resultant distortion will render the image quality irrelevant.

If a user of a mobile communication terminal uses the terminal to watch a movie or photograph moving images, the terminal must be constantly moved to compensate for the angle between the display of the terminal and the user's eyes to avoid distortion of the displayed image. The need for such constant manual compensation may decrease the viewing pleasure for the user.

Although there is a method known in the art for compensating for the effects of terrestrial magnetism on a displayed image, the method is applied mainly to large home appliances that display images on a display unit by emitting an electron beam. The method is not adaptable to a mobile communication device such as a mobile terminal. Furthermore such a method would not adequately compensate for the image gradient due to the angle between the terminal and the user's line of sight.

A method is also known in the art for inverting an image displayed by a rotary type folder mobile communication terminal. However, the method does not solve the problem presented when the user views the display of the mobile communication terminal at a less-than-optimum angle.

Presently, the only method known in the art for focusing an image displayed by a mobile communication terminal on the user's eyes is for the user to manually adjust the terminal to compensate for the image gradient. Not only does this method not completely alleviate the problem, it may present additional problems. The user is further inconvenienced by having to manually adjust the terminal. Furthermore, for some mobile communication terminals, such as those in a vehicle, the user may not be able to manually adjust the terminal safely.

Therefore, there is a need for a mobile communication terminal that automatically compensates for the image gradient of a displayed image in order to provide the user with an improved viewing experience. The present invention addresses this and other needs.

SUMMARY OF THE INVENTION

An object of the present invention is to provide automatic compensation for an image gradient of a mobile communication terminal display such that a displayed image is aligned with respect to a user's line of sight when the terminal is tilted with respect to the user's head. To achieve these and other objects and in accordance with the purpose of the present invention, as embodied and broadly described herein, there is provided an apparatus and method for automatically compensating for an image gradient of a mobile communication terminal.

In one aspect of the invention, an apparatus is provided for automatically compensating for an image gradient of a mobile communication terminal. The apparatus includes an image input unit for receiving a user's image and determining the user's line of sight, a data process unit for processing the information corresponding to the user's line of sight and generating control information to compensate for a calculated image gradient, and a display unit for displaying a viewable image that may adjusted to compensate for the calculated image gradient.

The image input unit receives an image of the user, for example by utilizing a camera that is adapted to photograph the user as he or she views the display of the mobile terminal. The received image is examined to determine the user's line of sight. It is contemplated that a camera that is part of the image input unit may be a second camera that is provided in addition to a first camera used by the mobile terminal to take photographs, thereby allowing compensation for an image gradient related to the image viewed by the user as he uses the mobile terminal to take photographs.

Preferably, the user's line of sight is determined by recognizing a specific portion of the user's anatomy, such as the face, eyes, ears, eyebrows, mouth or nose. A face recognizing technique such as a Support Vector Machine (SVM) algorithm may perform recognition of the specific portion of the user's anatomy.

The data process unit utilizes information from the image input unit related to the user's line of sight and calculates a corresponding image gradient relating the user's line of sight to the mobile communication terminal. The data process unit generates control information that is utilized by the display unit to compensate for the calculated image gradient.

It is contemplated that the image gradient may be calculated by superimposing an arbitrary line, preferably straight, on user image information corresponding to the user's line of sight and comparing the arbitrary line to a reference coordinate system stored in the mobile communication terminal. It is contemplated that the reference coordinate system may contain one or more vertical and/or horizontal lines and the arbitrary line is preferably superimposed on a specific portion of the user's anatomy, for example a line between the user's eyes, ears, or eyebrows or between the user's mouth and nose.

One or more threshold values may be utilized to determine whether to adjust the viewable image displayed by the terminal to compensate for the image gradient. For example a maximum threshold value and minimum threshold value may be utilized to define an allowable range of relative angles between the terminal and the user's line of sight for which no image adjustment is required, and the displayed image is adjusted only if the image gradient is outside the allowable range.

Preferably, the data process unit includes a memory unit having a non-volatile memory and a volatile memory and a central control unit. The non-volatile memory contains an algorithm for controlling all functions of the mobile communication terminal and another algorithm for calculating an image gradient. The volatile memory is used to store and process user image information from the image input unit. The central control unit calculates the image gradient by performing an algorithm using the information stored in the volatile memory and generates corresponding control information.

The display unit utilizes control information from the data process unit to adjust a displayed viewable image. The adjusted displayed viewable image, having been compensated for the image gradient, allows the user to appreciate the full effect of the image that is displayed.

In another aspect of the invention, a method is provided for automatically compensating for an image gradient of a mobile communication terminal. The method includes determining a user's line of sight in a captured image of the user and generating user image information related to the user's line of sight, calculating an image gradient relating the user's line of sight to the mobile communication terminal, generating control information corresponding to the calculated image gradient, and displaying a viewable image that may be adjusted to compensate for the image gradient.

The captured image, for example an image photographed by a camera, is examined to determine the user's line of sight. Preferably, the user's line of sight is determined by recognizing a specific portion of the user's anatomy, such as the face, eyes, ears, eyebrows, mouth or nose. A face recognizing technique such as a Support Vector Machine (SVM) algorithm may perform recognition of the specific portion of the user's anatomy.

It is contemplated that the image gradient may be calculated by superimposing an arbitrary line, preferably straight, on the user image information corresponding to the user's line of sight and comparing the arbitrary line to a reference coordinate system stored in the mobile communication terminal. It is contemplated that the reference coordinate system may contain one or more vertical and/or horizontal lines.

The arbitrary line superimposed on the user image information corresponding to the user's line of sight is preferably superimposed on a specific portion of the user's anatomy, for example a line between the user's eyes, ears, or eyebrows or between the user's mouth and nose. The image gradient may consist of the relative angle between the arbitrary line and one of more lines of the reference coordinate system with the size of the relative angle used for adjustment of the displayed viewable image.

One or more threshold values may be utilized to determine whether to adjust the viewable image displayed by the terminal to compensate for the image gradient. For example a maximum threshold value and minimum threshold value may be utilized to define an allowable range of relative angles between the terminal and the user's line of sight for which no image adjustment is required, and the displayed image is adjusted only if the image gradient is outside the allowable range.

In another aspect of the invention, a method is provided for automatically compensating for an image gradient of a mobile communication terminal. The method includes sequentially recognizing or detecting the user's face and then a specific portion of the user's face in a captured image of the user and generating user image information related to the specific portion of the user's face, calculating an image gradient relating the specific portion of the user's face to the mobile communication terminal, generating control information corresponding to the calculated image gradient, and displaying a viewable image that may be adjusted to compensate for the image gradient based on minimum and maximum threshold values.

The captured image, for example an image photographed by a camera, is examined to determine if it contains the user's face and then to recognize a specific portion of the user's face. Preferably, the specific portion of the user's face is the eyes, ears, eyebrows, mouth or nose. A face recognizing technique such as a Support Vector Machine (SVM) algorithm may perform recognition of the specific portion of the user's face.

It is contemplated that the image gradient may be calculated by superimposing an arbitrary line, preferably straight, on the user image information corresponding to the specific portion of the user's face and comparing the arbitrary line to a reference coordinate system stored in the mobile communication terminal. It is contemplated that the reference coordinate system may contain one or more vertical and/or horizontal lines.

The arbitrary line superimposed on the user image information corresponding to the specific portion of the user's face is preferably related to the user's line of sight, for example a line between the user's eyes, ears, or eyebrows or between the user's mouth and nose. The image gradient may consist of the relative angle between the arbitrary line and one of more lines of the reference coordinate system with the size of the relative angle used for adjustment of the displayed viewable image.

The threshold values are utilized to determine whether to adjust the viewable image displayed by the terminal to compensate for the image gradient. In a preferred embodiment, the maximum threshold value and minimum threshold value define an allowable range of relative angles between the terminal and the user's line of sight for which no image adjustment is required, and the displayed image is adjusted only if the image gradient is outside the allowable range.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for automatically compensating for an image gradient of a mobile communication terminal such that a displayed image is aligned with respect to a user's line of sight when a the terminal is tilted with respect to the user's head. Although the present invention is illustrated with respect to a mobile communication device, it is contemplated that the present invention may be utilized anytime it is desired to compensate for an image gradient of a device having a display such that a displayed image is aligned with respect to a user's line of sight when the device is tilted with respect to the user's head.

Figure 1:
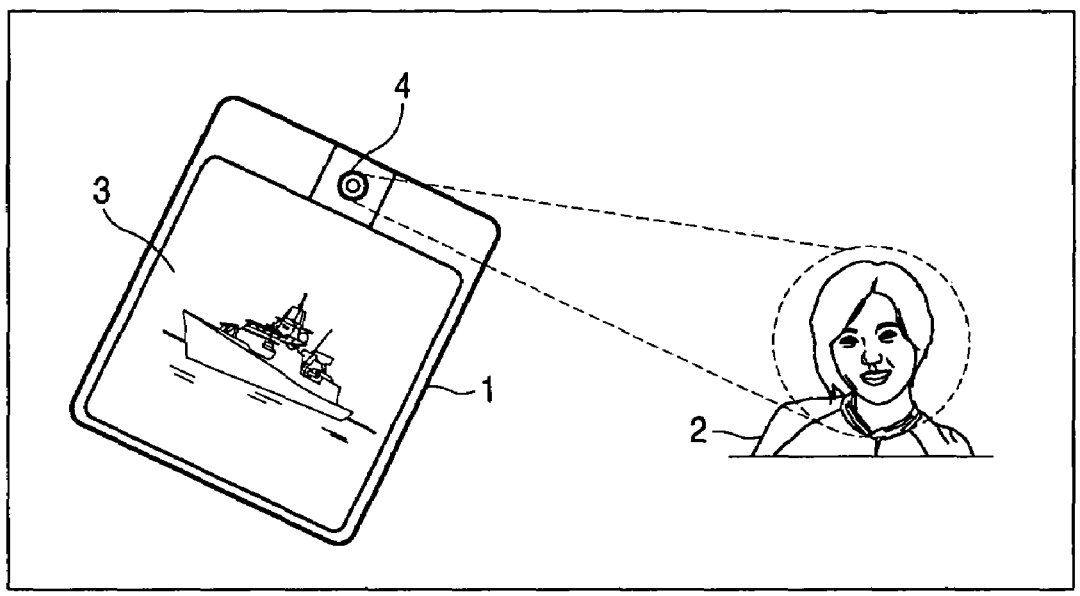
FIG. 1 illustrates a typical situation where compensation of an image gradient of a mobile communication terminal display is performed using an apparatus and method according to the present invention.
Figure 1:
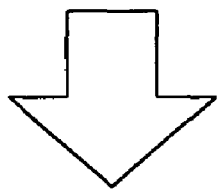
Figure 1:
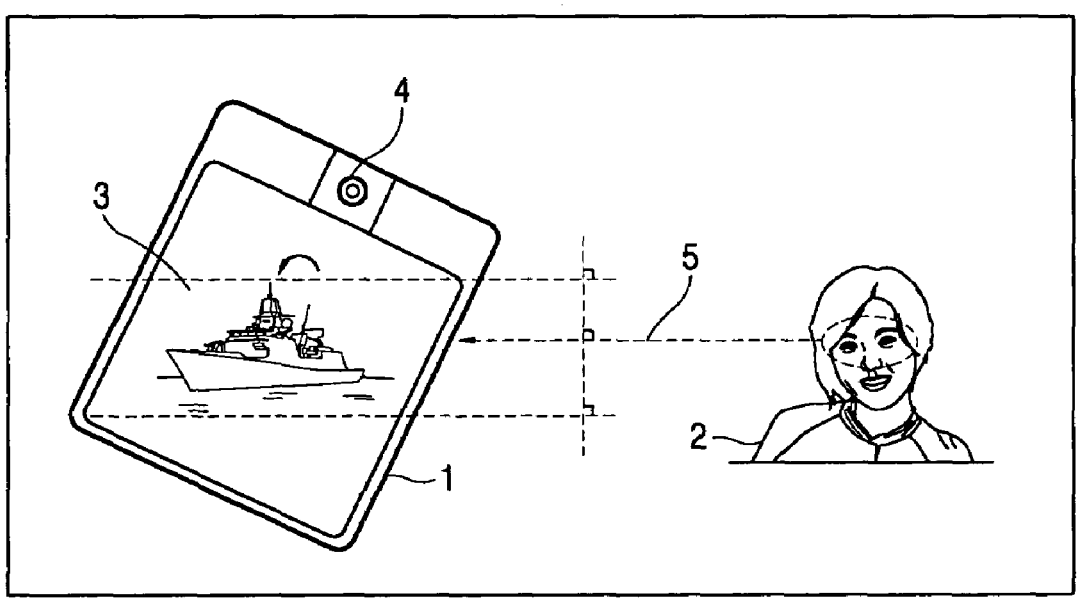

Referring to the upper drawing of FIG. 1, the situation is illustrated where a mobile communication terminal 1 is tilted while the user 2 is viewing an image 3 on the terminal display. Using the present invention, a camera 4 in the terminal 1 captures an image of the user 2 and the relative angle between the terminal and the user's line of sight 5 is determined such that the terminal automatically compensates for the relative angle, or image gradient, by adjusting the displayed image 3.

Referring to the lower drawing of FIG. 1, the result of the compensation for the image gradient is illustrated. For example, if the mobile communication terminal 1 is tilted to the right at approximately 15° relative to the user's line of sight, the image 3 displayed by the terminal is tilted to the left by approximately 15° to correctly focus the displayed image for the user's line of sight.

Figure 2:
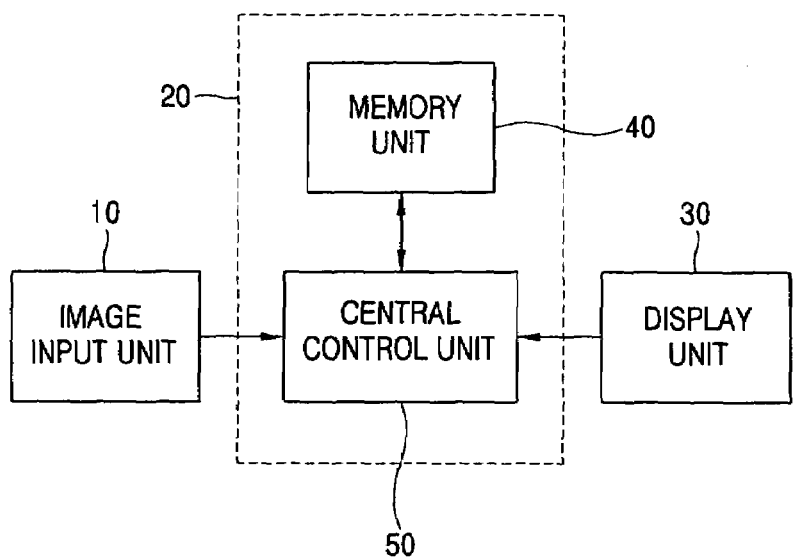
FIG. 2 illustrates an apparatus for automatically compensating for an image gradient of a mobile terminal display according to the present invention.

Referring to FIG. 2, apparatus for automatically compensating for an image gradient of a mobile communication terminal display according to the present invention is illustrated. The apparatus 1 includes an image input unit 10, a data process unit 20, and a display unit 30.

The image input unit 10 receives the image of a user 2, for example from a camera 4 mounted inside or outside the mobile communication terminal 1. The image input unit 10 determines the user's line of sight 5 from the received image and provides user image information corresponding to the user's line of sight to the data process unit 20. In a preferred embodiment, the camera 4 is a digital camera.

The data process unit 20 calculates an image gradient related to the angle between the user's line of sight and the terminal 1 using the user image information from the image input unit. Based upon the image gradient, the data process unit 20 generates control information, such as a control signal, for adjusting an image 3 displayed by the display unit 30 to compensate for the image gradient.

The display unit 30 displays an image 3 for viewing by the user 2. The display unit 30 utilizes control information from the data process unit 20 to adjust the displayed image 3 to compensate for the calculated image gradient.

Preferably, the data process unit 20 includes a memory unit 40 and a central control unit 50. Non-volatile memory, such as an Electrically Erasable Programmable Read-Only Memory (EEPROM), in the memory unit 40 includes an algorithm for controlling all functions inside the mobile communication terminal 1 and an algorithm for calculating an image gradient. Volatile memory, such as a Random Access Memory (RAM), in the memory unit 40 is utilized to store and process user image information from the image input unit 10.

The central control unit 50 processes user image information from the image input unit 10 and performs the algorithms of the memory unit 40. The central control unit 50 calculates an image gradient and generates corresponding control information, for example a control signal.

Determination of the user's line of sight 5 is preferably by recognition of a specific portion of the user's anatomy, such as the face, eyes, ears, eyebrows, mouth or nose. Recognition of a specific portion of the user's anatomy may be by one of the various face recognition techniques known in the art such as a Support Vector Machine (SVM) algorithm in pattern matching methods. Using a face recognition technique such as the SVM algorithm, each portion of a user's face may be recognized.

Vapnik announced the SVM algorithm, which is utilized to classify objects having two dimensions, in 1979. The SVM algorithm is representative of face recognizing algorithms that are known or are currently being researched. Using the SVM algorithm, an object having two dimensions is determined as occupying at a certain dimensional space and divided into a certain hyper-plane, a proper hyper-plane, which is searched to prevent a misclassification. There may be numerous hyper-planes for dividing two dimensions. The SVM algorithm determines the most suitable hyper-plane.

Preferably, the image gradient is calculated by comparing an arbitrary line, preferably straight, superimposed on the user image information with a reference coordinate system of the mobile communication terminal 1. The arbitrary line represents the user's line of sight, for example a line between the user's eyes, ears, or eyebrows or between the user's mouth and nose. The reference coordinate system may contain one or more vertical and/or horizontal lines.

Accordingly, it is determined whether the mobile communication terminal 1 and the user's line of sight 5 are consistent. If it is determined that the mobile communication terminal 1 is tilted from the user's line of sight 5, the degree of tilt, or image gradient, is calculated and the image 3 displayed by the display unit 30 may be adjusted to compensate for the image gradient.

A threshold may be used to determine when the image 3 displayed by the display unit 30 is adjusted. For example, if the image gradient is greater than a maximum threshold value or less than a minimum threshold value such that the image gradient is outside an allowable range, the data process unit 20 generates control information to adjust the displayed image 3. However, if the image gradient is less than or equal to the maximum threshold value and greater than or equal to the minimum threshold value such that the image gradient is within an allowable range, the data process unit 20 does not generate control information to adjust the displayed image 3.

Figure 3:
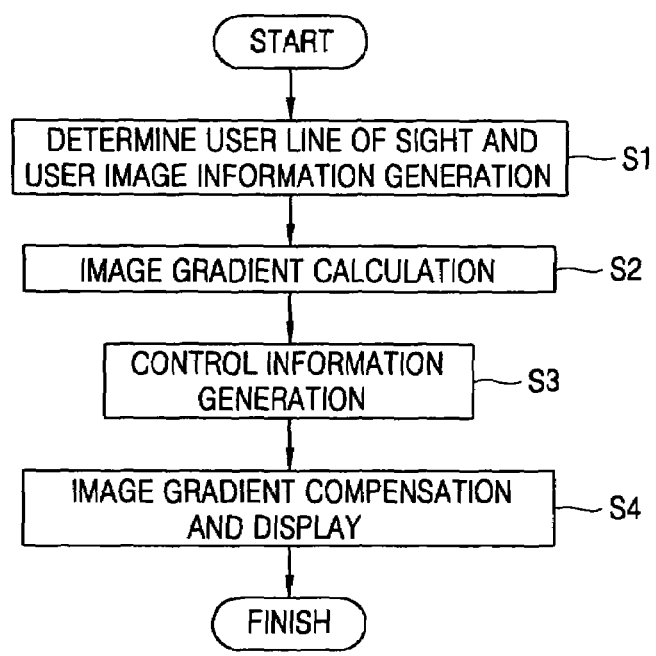
FIG. 3 is a flow chart illustrating a method for automatically compensating for an image gradient of a mobile communication terminal display according to a first embodiment of the present invention.

Referring to FIG. 3, a flow chart of a method for automatically controlling for an image gradient of a mobile communication terminal according to one embodiment of the present invention is illustrated. The method includes determining a user's line of sight 5 from a captured image of the user and generating corresponding user image information (S1), utilizing the user image information to calculate an image gradient between the user's line of sight 5 and the mobile communication terminal 1 (S2), generating control information corresponding to the calculated image gradient (S3), and adjusting a displayed image 3 to compensate for the calculated image gradient according to the control information (S4).

The captured image, for example an image photographed by a camera 4 mounted inside or outside the mobile terminal 1, is examined to determine the user's line of sight. The determination the user's line of sight 5 is preferably done by recognizing a specific portion of the user's anatomy, such as the face, eyes, ears, eyebrows, mouth or nose. A face recognizing technique, such as an SVM algorithm, is preferably used to recognize the specific portion of the user's anatomy.

Preferably, the image gradient is calculated by comparing an arbitrary line, preferably straight, superimposed on the user image information with a reference coordinate system of the mobile communication terminal 1. The arbitrary line represents the user's line of sight, for example a line between the user's eyes, ears, or eyebrows or between the user's mouth and nose. The reference coordinate system may contain one or more vertical and/or horizontal lines.

Control information is generated based upon the calculated image gradient. The control information may be used to adjust a displayed image 3 to compensate for the calculated image gradient, for example by rotating the image by an angle equal to the image gradient.

A threshold may be used to determine when the image 3 displayed by the display unit 30 is adjusted. For example, if the image gradient is greater than a maximum threshold value or less than a minimum threshold value such that the image gradient is outside an allowable range, control information to adjust the displayed image 3 will be generated. However, if the image gradient is less than or equal to the maximum threshold value or greater than or equal to the minimum threshold value such that the image gradient is within an allowable range, no control information to adjust the displayed image 3 is generated.

Figure 4:
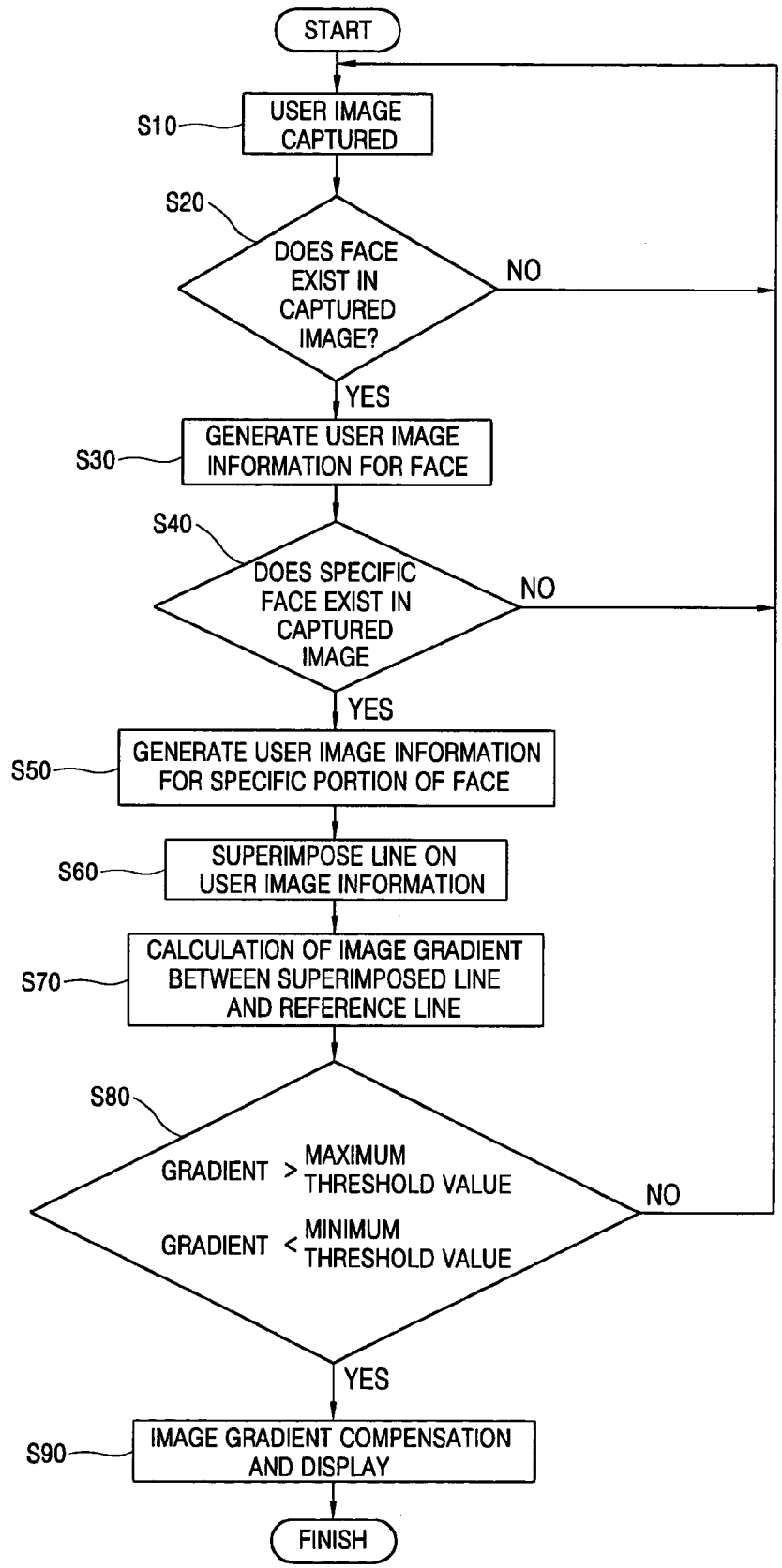
FIG. 4 is a flow chart illustrating a method for automatically compensating for an image gradient of a mobile communication terminal display according a second embodiment of the present invention.

Referring to FIG. 4, a flow chart of a method for automatically controlling for an image gradient of a mobile communication terminal according to a second embodiment of the present invention is illustrated. The method utilizes a captured image of a user 1 to determine first if the user's face is contained in the captured image and then if a specific portion of the user's face is contained in the captured image and adjusts a displayed image 3 if a calculated image gradient is outside a threshold range.

An image of the user 2 is obtained, preferably by a camera 4 mounted inside or outside the mobile terminal 1 (S10). The image is examined to determine whether the user's face was captured (S20). If the user's face was not captured in the image, the operation is repeated and a new image captured (S10).

If the user's face was captured, user image information related to the face portion of the captured image is generated (S30). It is then determined whether a specific portion of the user's face related to the user's line of sight 5 exists in the captured image (S40). If a specific portion of the user's face related to the user's line of sight 5 does not exist in the captured image, the operation is repeated and a new image captured (S10).

If a specific portion of the face related to the user's line of sight 5 exists in the captured image, user image information related to the specific portion of the face in the captured image is generated (S50). Then, an arbitrary line is superimposed on the user image information related to the specific portion of the user's face to represent the user's line of sight 5 (S60). It is contemplated that a preferably straight line connecting the user's eyes, eyebrows or ears as well as a vertical line passing through the bridge of the user's nose may be used to represent the user's line of sight 5.

An image gradient is calculated by determining the angle between the superimposed line and a reference line stored in the memory unit of the mobile communication terminal 1 (S70). Preferably, the reference line is part of a reference coordinate system of the terminal 1. The reference coordinate system may contain one or more vertical and/or horizontal lines.

The calculated image gradient is compared to a maximum threshold value and a minimum threshold value to determine if adjustment of the displayed image is necessary (S80). It is contemplated that the maximum and minimum threshold values may correspond to an allowable range of image gradient for which the displayed image 3 is not sufficiently distorted so as to need adjustment.

If the image gradient is greater than the maximum threshold value or less than the minimum threshold value, the displayed image 3 is adjusted, for example by rotating the image by an angle equal to the image gradient (S90). If the image gradient is less than or equal to the maximum threshold value and more than or equal to the minimum threshold value, no image adjustment is performed.

For example, if it is assumed that an image gradient of +/−5° is allowable before the displayed image 3 needs to be adjusted, the maximum threshold value is 5° and the minimum threshold value is −5°. If the angle between the line representing the user's line of sight 5 and the reference line stored in the mobile terminal is −15°, which is less than the minimum threshold, the displayed image might be adjusted by +15° to compensate for the image gradient. However, if the angle between the straight line representing the user's line of sight 5 and the reference line stored in the mobile terminal is 3°, which is between the minimum and maximum thresholds, no adjustment of the displayed image 3 would be performed.

As described herein, the apparatus and the method of the present invention allows automatic compensation for an image gradient of a mobile communication terminal display. The user of the terminal need not hold the terminal parallel with his or her eyes in order to obtain the optimum view of a displayed image. The present invention automatically adjusts the displayed image such that it is focused on the users' eyes. The present invention may be applied not only to displayed images, but also to displayed text.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for automatically compensating for an image gradient of a mobile communication terminal display, the apparatus comprising:

an image input unit adapted to receive a user's image, determine the user's line of sight, and generate user image information corresponding to the user's line of sight;

a data process unit adapted to receive user image information from the image input unit, calculate an image gradient related to the angle between the user's line of sight and the terminal, generate control information corresponding to the image gradient, and compare the image gradient to a minimum threshold and a maximum threshold to determine if a viewable image is adjusted, wherein the viewable image is adjusted if the image gradient is greater than the maximum threshold value or less than the minimum threshold value; and a display unit adapted to display the adjusted viewable image.

2. The apparatus of claim 1, wherein the image input unit is adapted to receive the user's image from a camera mounted inside or outside the mobile terminal.

3. The apparatus of claim 2, wherein the camera is a digital camera.

4. The apparatus of claim 1, the data process unit further including:

a memory unit having volatile and non-volatile memory, the volatile memory adapted to store user image information from the image input unit and the non-volatile memory containing an algorithm for controlling all functions of the mobile terminal and an algorithm for calculating an image gradient; and a central control unit adapted to perform the algorithms stored in the memory unit to calculate the image gradient using the user image information stored in the memory unit and to generate corresponding control information.

5. The apparatus of claim 1, wherein the user's line of sight is related to a specific portion of the user's anatomy and the image input unit is adapted to recognize the specific portion in the user's anatomy.

6. The apparatus of claim 5, wherein the specific portion is one of the user's face, eyes, ears, eyebrows, mouth and nose.

7. The apparatus of claim 5, wherein the image input unit is further adapted to perform a face recognition technique to recognize the specific portion of the user's anatomy.

8. The apparatus of claim 7, wherein the face recognition technique is a support vector machine (SYM) algorithm.

9. The apparatus of claim 1, wherein the data process unit is further adapted to compare an arbitrary line superimposed on the user image information with a reference coordinate system of the mobile terminal.

10. The apparatus of claim 9, wherein the reference coordinate system comprises at least one of a horizontal line and a vertical line.

11. The apparatus of claim 9, wherein the arbitrary line is one of a relatively straight horizontal line and a relatively straight vertical line.

12. The apparatus of claim 9, wherein the arbitrary line connects one of the user's two eyes, the user's two ears, and the user's two eyebrows.

13. The apparatus of claim 9, wherein the arbitrary line connects the user's mouth and nose.

14. The apparatus of claim 1, wherein the control information comprises a control signal.

15. A method for automatically compensating for an image gradient of a mobile communication terminal display, the method comprising the steps of:

determining a user's line of sight via an image input unit from a captured image and generating user image information;

calculating an image gradient via a control unit between the user's line of sight and the mobile terminal using the user image information;

generating control information via the control unit corresponding to the image gradient;

comparing the image gradient via the control unit to a minimum threshold and a maximum threshold to determine if a viewable image is adjusted by the control information, wherein the viewable image is adjusted by the control information if the image gradient is greater than the maximum threshold value or less than the minimum threshold value; and displaying the adjusted viewable image on the mobile communication terminal display.

16. The method of claim 15, wherein the captured image is received from a camera mounted inside or outside the mobile terminal.

17. The method of claim 15, wherein the user's line of sight is related to a specific portion of the user's anatomy and the step of determining the user's line of sight further comprises recognizing the specific portion of the user's anatomy in the captured image.

18. The method of claim 17, wherein the specific portion is one of the user's face, eyes, ears, eyebrows, mouth and nose.

19. The method of claim 17, wherein recognizing the specific portion of the user's anatomy comprises performing a face recognition technique.

20. The method of claim 19, wherein the face recognition technique comprises a support vector machine (SYM) algorithm.

21. The method of claim 15, wherein calculating an image gradient comprises:

superimposing an arbitrary line on the user image information; and comparing the arbitrary line with a reference coordinate system of the mobile terminal.

22. The method of claim 21, wherein the arbitrary line is one of a relatively straight horizontal line and a relatively straight vertical line.

23. The method of claim 21, wherein the reference coordinate system comprises at least one of a horizontal reference line and a vertical reference line.

24. The method of claim 21, wherein the arbitrary line connects one of the user's two eyes, the user's two ears, and the user's two eyebrows.

25. The method of claim 21, wherein the arbitrary line connects the user's mouth and nose.

26. The method of claim 15, wherein the displayed viewable image is adjusted by an angle equal to the image gradient.

27. The method of claim 15, wherein the control information causes no adjustment of the displayed viewable image if the image gradient is one of equal to a maximum threshold value, between the maximum threshold value and a minimum threshold value, and equal to the minimum threshold value.

28. A method for automatically compensating for an image gradient of a mobile communication terminal display, the method comprising the steps of:

capturing an image via an image capture unit of a user of the mobile communication terminal and generating user image information;

determining that the captured image contains the user's face via an image input unit;

recognizing a specific portion of the user's face in the captured image;

superimposing an arbitrary line on the specific portion of the user's face in the user image information;

calculating an image gradient via a control unit between the superimposed line and a reference line stored in the mobile terminal;

comparing the calculated image gradient via the control unit to a maximum threshold value and a minimum threshold value;

adjusting the viewable image if the image gradient is greater than the maximum threshold value or less than the minimum threshold value; and displaying the adjusted viewable image on the terminal display, is different from the captured image.

29. The method of claim 28, wherein the image is captured by a camera mounted inside or outside the mobile terminal.

30. The method of claim 28, wherein the specific portion is related to the user's line of sight.

31. The method of claim 30, wherein the specific portion is one of the user's eyes, ears, eyebrows, mouth and nose.

32. The method of claim 28, wherein the arbitrary line is one of a relatively straight horizontal line and a relatively straight vertical line.

33. The method of claim 28, wherein recognizing a specific portion of the user's face comprises performing a face recognition technique.

34. The method of claim 33, wherein the face recognition technique comprises a support vector machine (SYM) algorithm.

35. The method of claim 28, wherein calculating an image gradient comprises comparing the arbitrary line with a reference coordinate system of the mobile terminal.

36. The method of claim 35, wherein the reference coordinate system comprises at least one of a horizontal reference line and a vertical reference line.

37. The method of claim 28, wherein the arbitrary line connects one of the user's two eyes, the user's two ears, and the user's two eyebrows.

38. The method of claim 28, wherein the arbitrary line connects the user's mouth and nose.

39. The method of claim 28, wherein the displayed viewable image is adjusted by an angle equal in size to the image gradient.

* * * * *